United States Patent
Kundak et al.

(10) Patent No.: US 10,261,194 B2
(45) Date of Patent: Apr. 16, 2019

(54) SYSTEMS AND METHODS FOR VEHICLE ATTITUDE DETERMINATION

(71) Applicant: Honeywell International Inc., Morris Plains, NJ (US)

(72) Inventors: Nuri Kundak, Prague (CZ); Brian W. Schipper, Brooklyn Park, MN (US)

(73) Assignee: Honeywell International Inc., Morris Plains, NJ (US)

( * ) Notice: Subject to any disclaimer, the term of this patent is extended or adjusted under 35 U.S.C. 154(b) by 792 days.

(21) Appl. No.: 14/989,126

(22) Filed: Jan. 6, 2016

(65) Prior Publication Data
US 2017/0192103 A1    Jul. 6, 2017

(51) Int. Cl.
*G01S 19/55* (2010.01)
*G01S 19/05* (2010.01)
(Continued)

(52) U.S. Cl.
CPC .............. *G01S 19/55* (2013.01); *G01S 19/05* (2013.01); *G01S 19/53* (2013.01); *G01C 21/165* (2013.01);
(Continued)

(58) Field of Classification Search
CPC ....... G01C 21/165; G01S 19/44; G01S 19/04; G01S 19/43; G01S 19/20; G01S 19/258;
(Continued)

(56) References Cited

U.S. PATENT DOCUMENTS

| 5,917,445 A | 6/1999 | Schipper et al. |
| 6,114,988 A | 9/2000 | Schipper et al. |

(Continued)

FOREIGN PATENT DOCUMENTS

EP    2479588    7/2012

OTHER PUBLICATIONS

Baroni et al., "Analysis of Ambiguity Resolution Methods for Attitude Determination Using GPS Carrier Phase Measurements", 2012, pp. 1-9.

(Continued)

*Primary Examiner* — Olumide T Ajibade Akonai
(74) *Attorney, Agent, or Firm* — Fogg & Powers LLC (57) ABSTRACT

Systems and methods for vehicle attitude determination are provided. In one embodiment, a method for vehicle orientation detection comprises: generating differenced carrier phase measurements based on measurements from an on-board GNSS Receiver System; receiving attitude aiding measurements and a baseline length from on-board aiding sources; calculating float ambiguity values with associated covariance values as a function of the differenced carrier phase measurements, attitude aiding measurements and baseline length; calculating a set of integer candidate arrays from the float ambiguity values, wherein the integer candidate arrays are calculated from dis-similar ambiguity estimation algorithms; selecting a first integer candidate array as resolved integer values as a function of residuals calculated from the differenced carrier phase measurements and the attitude aiding measurements and the baseline length and further based on comparing the plurality of residuals to a plurality of thresholds; and outputting the resolved integer values to an attitude and heading calculator.

20 Claims, 7 Drawing Sheets (51) Int. Cl.
  *G01S 19/53* (2010.01)
  *G01S 19/54* (2010.01)
  *G01C 21/16* (2006.01)
  *G01S 19/04* (2010.01)
  *G01S 19/44* (2010.01)

(52) U.S. Cl.
  CPC .............. *G01S 19/04* (2013.01); *G01S 19/44* (2013.01); *G01S 19/54* (2013.01)

(58) Field of Classification Search
  CPC ......... G01S 19/32; G01S 19/55; G01S 19/41; G01S 19/05; G01S 19/40; G01S 19/53; G01S 19/54; G01S 19/23; G01S 19/51; G01S 19/33; G01S 19/07
  USPC ............. 342/357.23, 357.24, 357.26, 357.27
  See application file for complete search history.

(56) References Cited

U.S. PATENT DOCUMENTS

| | | | |
|---|---|---|---|
| 6,256,583 B1 | 7/2001 | Sutton | |
| 6,259,398 B1 | 7/2001 | Riley | |
| 6,424,915 B1 | 7/2002 | Fukuda et al. | |
| 6,611,228 B2* | 8/2003 | Toda | G01S 19/55 342/357.38 |
| 7,026,982 B2 | 4/2006 | Toda et al. | |
| 7,355,549 B2 | 4/2008 | Fukuda et al. | |
| 2002/0029110 A1* | 3/2002 | Fukuda | G01C 21/165 701/470 |
| 2003/0154049 A1* | 8/2003 | Toda | G01S 19/55 702/151 |
| 2006/0106533 A1* | 5/2006 | Hirokawa | G01C 21/165 701/472 |
| 2007/0040737 A1* | 2/2007 | Fukuda | G01S 19/41 342/357.24 |
| 2007/0052583 A1* | 3/2007 | Zhodzishsky | G01C 21/00 342/357.24 |
| 2012/0176271 A1* | 7/2012 | Dai | G01S 19/04 342/357.44 |
| 2016/0320493 A1* | 11/2016 | Wu | G01S 19/41 |

OTHER PUBLICATIONS

Gebre-Egziabher et al., "Analysis of Single Frequency, Carrier Phase Based GPS Positioning Performance and Sensor Aiding Requirements", "ITS Institute Intelligent Transportation Systems", Jan. 2013, pp. 1-50, Publisher: Univeristy of Minnesota, Published in: US.

Giorgi et al., "Instantaneous Ambiguity Resolution in Global-Navigation-Satellite-System-Based Attitude Determination Applications: A Multivariate Constrained Approach", "Journal of Guidance, Control, and Dynamics", Jan. 2, 2012, pp. 51-67, vol. 35, No. 1.

Meibo et al., "Exploring the Ambiguity Resolution in Spacecraft Attitude Determination Using GNSS Phase Measurement", "International Journal of Social, Behavorial, Educational, Economic and Management Engineering", 2013, pp. 854-858, vol. 7, No. 7, Publisher: World Academy of Science, Engineering and Technology, Published in: US.

Teunissen, "The Least-Squares Ambiguity Decorrelation Adjustment: A Method for Fast GPS Integer Ambiguity Estimation", "Journal of Geodesy", Nov. 14, 1994, pp. 65-82.

European Patent Office, "Extended European Search Report from EP Application No. 16204549.6 dated May 30, 2017", "from Foreign Counterpart of U.S. Appl. No. 14/989,126", May 30, 2017, pp. 1-11.

Teunissen et al., "Performance of the LAMBDA Method for Fast GPS Ambiguity Resolution", Jul. 1997, pp. 373-383, vol. 44, No. 3, Publisher: Navigation: Journal of the Institute of Navigation, Published in: US.

\* cited by examiner

SYSTEMS AND METHODS FOR VEHICLE ATTITUDE DETERMINATION

BACKGROUND

The attitude and heading of a vehicle can be essential information which is typically provided by systems using inertial sensors. Using a Global Navigation Satellite System (GNSS) for attitude sensing offers a lower cost, lower weight, smaller volume, and lower power consumption alternative. GNSS attitude determination works by differencing the carrier-phase signals of multiple receivers/antenna pairs. While carrier phase is a very accurate measure of range change with errors on the order of millimeters, because it is the output of an integrator it also has an associated integer ambiguity error. Integer ambiguity is the unknown number of whole cycles of carrier signals between the satellite and antenna. In many applications, such as for in-flight passenger aircraft, quick and accurate attitude determination is critical for safe operation. In order to utilize carrier phase to get the best heading and attitude determinations for such fast moving vehicles, it is necessary to resolve the integer ambiguity quickly and accurately. While existing integer estimation algorithms, such as the LAMBDA (Least-squares AMBiguity Decorrelation Adjustment) algorithm, may provide ambiguity resolutions sufficient for use in precision farming and mining applications, they do not themselves provide sufficiently reliable high integrity solutions in all conditions such that they can be used for flight certified systems aboard aircraft.

For the reasons stated above and for other reasons stated below which will become apparent to those skilled in the art upon reading and understanding the specification, there is a need in the art for improved systems and methods for vehicle attitude determination.

SUMMARY

The Embodiments of the present invention provide methods and systems for vehicle attitude determination and will be understood by reading and studying the following specification.

In one embodiment, a method for vehicle orientation detection comprises: generating differenced carrier phase measurements based on carrier phase measurements from an on-board Global Navigation Satellite System (GNSS) Receiver System; receiving attitude aiding measurements and a baseline length from one or more on-board aiding sources; calculating a plurality of float ambiguity values with associated covariance values as a function of the differenced carrier phase measurements, the attitude aiding measurements and the baseline length; calculating a set of integer candidate arrays from the plurality of float ambiguity values, wherein the integer candidate arrays are calculated from dis-similar ambiguity estimation algorithms; selecting a first integer candidate array from the set of integer candidate arrays as resolved integer values as a function of a plurality of residuals calculated from the differenced carrier phase measurements and the attitude aiding measurements and the baseline length and further based on comparing the plurality of residuals to a plurality of thresholds; and when the resolved integer values are selected, outputting the resolved integer values to an attitude and heading calculator.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention provide solutions for resolving integer ambiguity for GNSS based attitude determination for vehicles. As explained in greater detail below, the solutions described herein utilize data from on-board aiding sources processed in combination with differenced carrier phase measurements to implement initialization and validation logic in conjunction with integer estimation processes.

Figure 1:
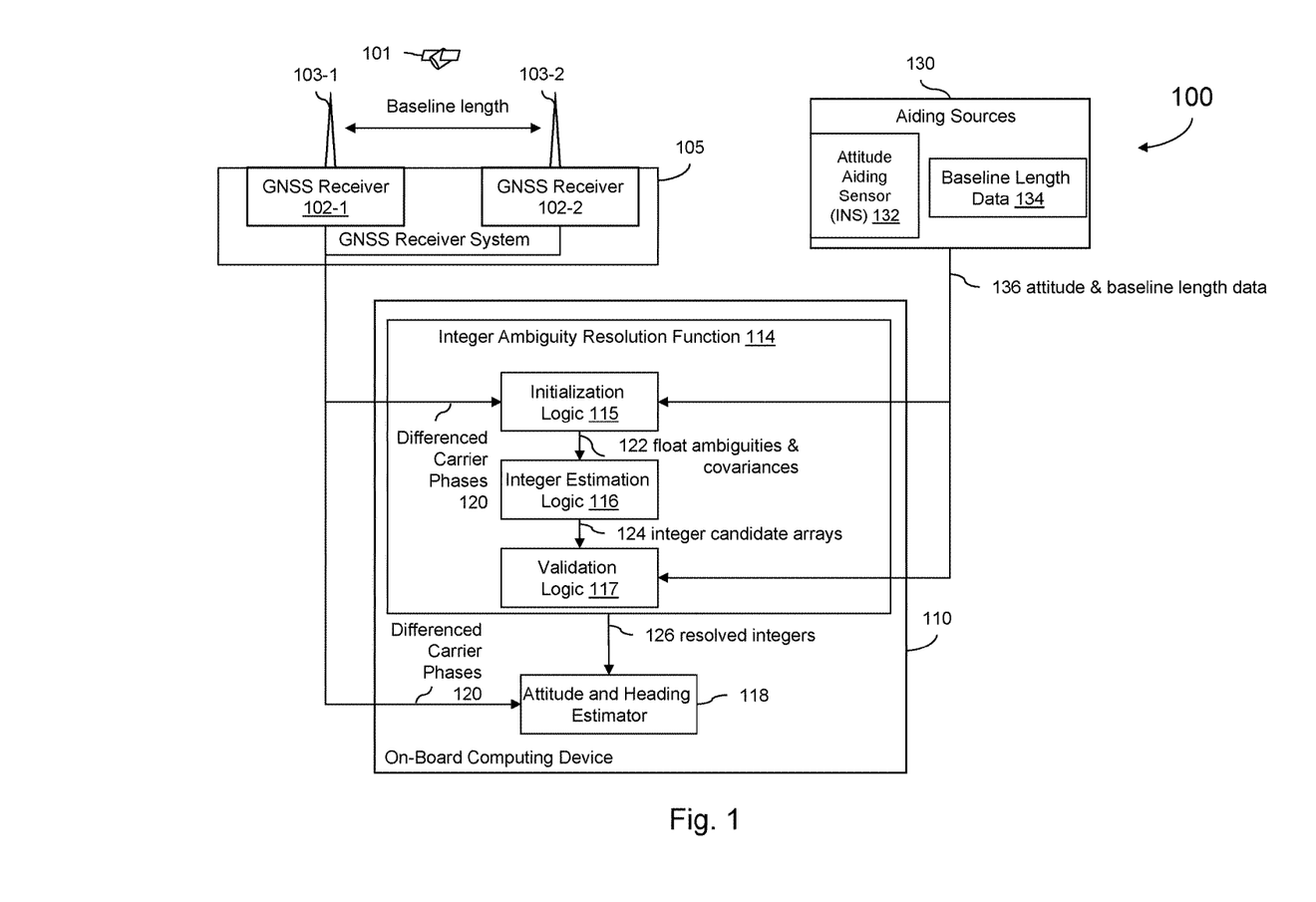
FIG. 1 is a block diagram of a vehicle orientation detection system 100 of one embodiment of the present disclosure.

FIG. 1 is a diagram of a vehicle orientation detection system 100 of one embodiment of the present invention. As the term is used herein, the "orientation" of a vehicle refers to heading or attitude of the vehicle, or both. System 100 includes a GNSS receiver system 105 that comprises two or more GNSS receivers. FIG. 1 shows an embodiment comprising two GNSS Receivers 102-1 and 102-2. In other implementations, system 100 may comprise three or more GNSS receivers.

When the GNSS receivers 102-1, 102-2 begin tracking a satellite signal from at least one satellite 101, they start tracking the carrier of the satellite signal. For example, a global positioning system (GPS) signal can have a carrier frequency of 1.575 GHz which translates to a signal with an electromagnetic wavelength of approximately 19 cm. Either of the receivers 102-1, 102-2 can track changes in distance to the satellite 101 (for example, to within 1 mm in accuracy) by keeping track of how many cycles of 19 cm waveforms traverse over their respective antennas 103-1, 103-2 over a period of time. Individually, neither receiver can determine the absolute distance between its associated receiver antenna 103-1, 103-2 and satellite 101. As a result, each receiver 102-1, 102-2 can detect and measure small changes in distance to satellite 101 very accurately by detecting sub-wavelength variations in the received signal. However, they cannot detect the integer number of how many complete wavelengths exist in the distance between the antenna and the satellite 101. This unknown integer value is referred to as the integer ambiguity. This discussion would apply as well to each satellite that is tracked by GNSS receivers 102-1 and 102-2.

When the two GNSS receivers 102-1, 102-2 are both tracking the same satellite 101, they can resolve their relative sub-wavelength fractional range to the satellite 101. That is, together they can determine through differenced carrier phase measurements the fraction of a wavelength one antenna 103-1,103-2 moves towards or away from the satellite 101 with respect the other, even though there will still remain an unclear integer number of wavelengths from each receiver antenna 103-1,103-2 to the satellite 101.

As explained by the present disclosure, this differenced carrier phase measurement data from the two receivers 102-1, 102-2 can be utilized along with a baseline length 104 (defined as the distance between the antennas 103-1, 103-2 for each respective receiver 102-1, 102-2) and on-board sensed attitude aiding measurements to resolve an estimate for how many integer number of wavelengths there are between each of the antennas 103-1, 103-2 and the satellite 101. Utilizing a resolved integer estimated for each of antennas 103-1, 103-2 a range measurement difference from each of the two antennas 103-1, 103-2 to satellite 101 can directly translate into information that defines the orientation of the vehicle, both heading and attitude, with respect to a desired reference frame.

Accordingly, system 100 further comprises an integer ambiguity resolution function 114 coupled to the GNSS Receiver System 105. In some embodiments, GNSS Receiver System 105 generates differenced carrier phase measurements 120 from the carrier phase measurements it received from the receivers 102-1 and 102-2. Alternatively, in some embodiments, GNSS Receiver System 105 outputs the carrier phase measurements and the computations to produce the differenced carrier phase measurements takes place on the on-board computing device 110. System 100 is further coupled to aiding sources 130 which include an attitude aiding sensors 132 and baseline length data 134 (which may be stored in a memory) that describes a surveyed distance 102 between the antenna 103-1 and 103-2, and an attitude and heading estimator 118. In the embodiment shown in FIG. 1, the attitude aiding sensors 132 are implemented as inertial aiding sources or inertial navigation sensors (INS), but in other embodiments, other attitude aiding sensors are used. Using resolved integers 126 provided from integer ambiguity resolution function 114 to the attitude and heading estimator 118, the orientation of the vehicle can be determined by processing the carrier signals received from satellite 101.

With embodiments of the present disclosure, the integer ambiguity resolution function 114 comprises three components: initialization logic 115, integer estimation logic 116, and validation logic 117. The input of attitude and baseline length data 136 from aiding sources 130 is utilized by both initialization logic 115 and validation logic 117, as explained in greater detail below.

Initialization Logic 115 functions to restrict the search space over which integer estimation logic 116 operates using the baseline length data 133 and pitch, roll and heading angle measurements from aiding sensors 132. That is, when the algorithms executed by integer estimation logic 116 only need to search a much smaller space to converge on their integer candidates they can do so more quickly, and the potential for those algorithms to converge on false integer candidates is curtailed because many false integer candidates have been eliminated from the valid search space. More specifically, the output 122 of the initialization logic 115 is a plurality of float ambiguities also referred to as float values as well as error covariance values for each float value.

Each of the float values comprises an estimated number that lies between two integers while the error covariances provide an indication of the quality of the float value (that is, how likely it is that the float is near an integer that accurately reflects the unknown part of the distance to satellite 101).

In one embodiment, initialization logic 115 utilizes the aiding data 136 to calculate a baseline in the navigation frame using a function equivalent to:

$$\hat{B}_n = f(\rho, \theta, \psi) = \begin{bmatrix} \rho \cos\theta \cos\psi \\ \rho \cos\theta \sin\psi \\ -\rho \sin\theta \end{bmatrix}$$

Where $\hat{B}_n$ is the baseline in the navigation frame, $\rho$ is the survey baseline length 102 (i.e. as indicated by baseline length data 134), and $\theta$ and $\psi$ are respectively angular pitch and heading aiding measurements from aiding sensor 132. From this, float ambiguities 122 provided to integer estimation logic 116 can be estimated from:

$$\hat{N}_f = H \cdot \hat{B}_n - D_{cp}$$

Where H is a geometry matrix for mapping coordinate frames and $D_{cp}$ are the differenced carrier ranges 120 (differenced carrier phases multiplied by the signal wavelength) either provided by GNSS receiver system 105 or otherwise generated from carrier phases measured by GNSS receiver system 105. It should be noted that in any of the embodiments described herein, the differenced carrier phases 120 may comprise single difference carrier phase values or alternately double differenced carrier phase values. The integer estimation logic 116 will input float ambiguities 122 values, $\hat{N}_f$, and begin its search for integers around those float values. Standard deviations of code and carrier measurements errors, baseline surveying error, pitch, roll, and heading errors may be propagated according to above computations and any necessary coordinate transformations, in order to obtain a variance-covariance matrix of the float ambiguities. If the aiding sensor 132's error characteristics change, it will update its error covariances.

While the example implementation in FIG. 1 describes utilization of a single baseline using pitch and heading aiding, it should be appreciated that in other embodiments, this can be generalized to two or more baselines using all the Euler angles from the aiding source 130. The initialization using above information outputs to the integer estimation logic 116 an initial point for search which is a float (decimal) set of ambiguities, with a covariance matrix defining the search space boundaries. Using the baseline length and attitude aid as described in this disclosure, the size of the search space shrinks, and thus makes the integer estimation logic 116 more likely to complete in less time with greater accuracy.

Integer Estimation Logic 116 utilizes a plurality of different integer estimation algorithms that each separately calculate candidate solutions to output a set of integer candidate arrays. In one embodiment, at least one of the integer estimation algorithms comprises the LAMBDA method of any other algorithm that uses a search space to estimate the set of integer candidate arrays. The output values contained in the set of integer candidate arrays 124 that is output from integer estimation logic 116 may agree with each other in some instances, while in others they may not.

It should be appreciated that the integer estimation algorithms executed by Integer Estimation Logic 116 can still find the correct solutions even when given a mistake in the float ambiguity they receive as input, but the Integer Estimation Logic 116 can work faster and give more weight to computed integer candidate arrays that are closer to the float ambiguities when the initial search space is first restricted by initialization logic.

Validation logic 117 operates to establish one of the integer candidate arrays to output as the correct solution (that is, the resolved integers 126). When resolved integers 126 are successfully obtained, it may be provided as output to the attitude and heading estimator. Alternatively, when validation logic 117 cannot with confidence select any of the solutions as the correct solution, an alternate output indicating a lack of resolution may be provided. Validation logic 117 validates if any of the integer candidate arrays 124 from Integer Estimation Logic 116 is an acceptable integer array in terms of quality of the attitude solution. It should be noted that the validation logic 117 is independent of the initialization logic 115. That is, validation logic 117 operates on the integer candidate arrays 124 produced from Integer Estimation Logic 116 and is not sensitive to or otherwise dependent on the manner in which initialization was performed by initialization logic 115. Validation logic 117 functions not just as a test of integer candidate arrays at the time of ambiguity resolution, but it also keeps testing the resolved integers 126 as new measurements arrive over time. This addresses error sources such as multipath and cycle slips that are dynamic in nature and change with time and motion. The prioritization and modality of the validation logic 117 in combination with adjustable thresholds provides a tradeoff between accuracy, availability and integrity of the GNSS attitude.

Figure 3:
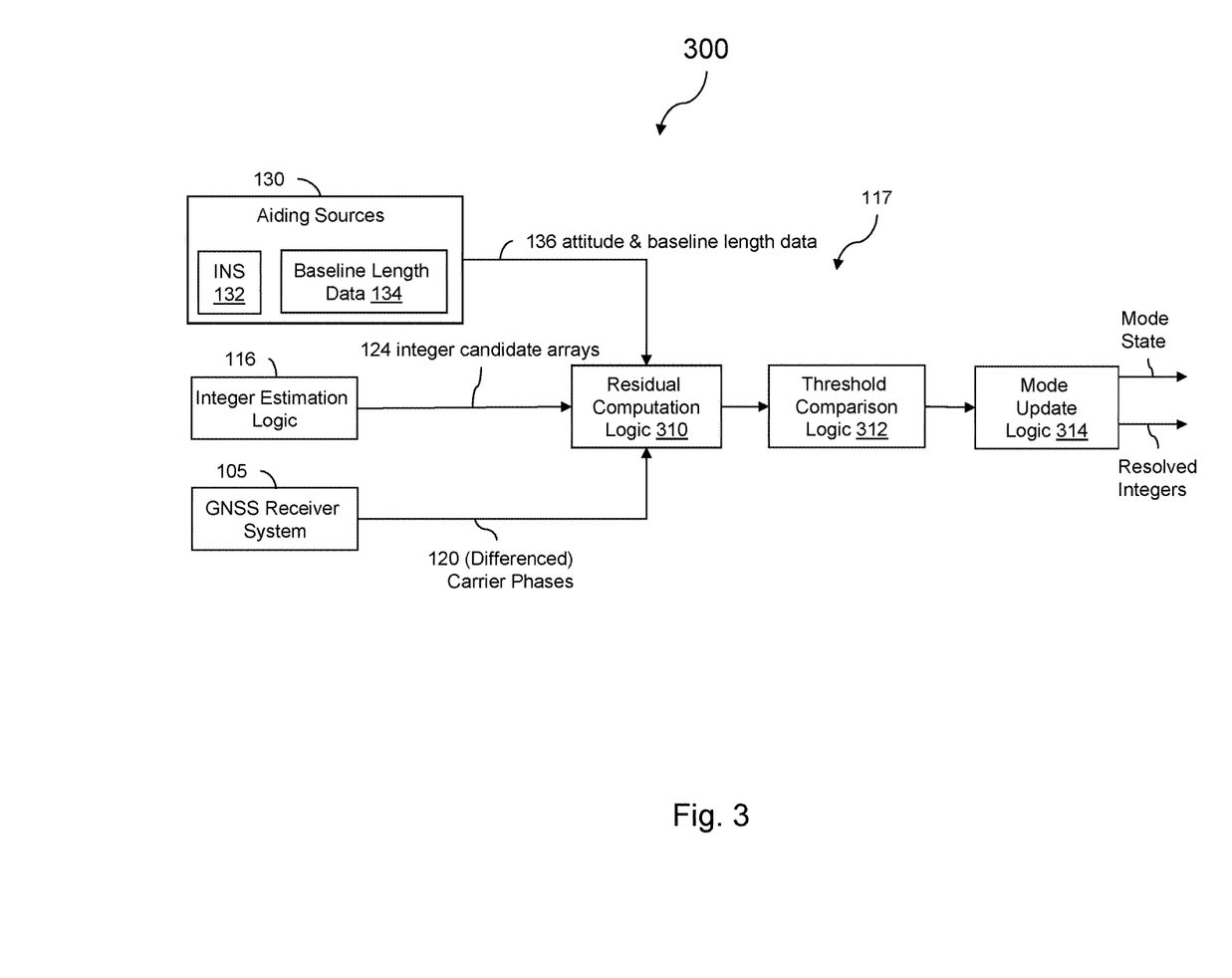
FIG. 3 is a block diagram illustrating validation logic for an Integer Ambiguity Resolution Function of one embodiment of the present disclosure.

FIG. 3 is a block diagram that illustrates generally at 300 validation logic 117 for one embodiment of the present disclosure. The validation logic 117 implementation shown in FIG. 3 includes residual computation logic 310, threshold comparison logic 312 and mode (or state) update logic 314. Attitude and baseline length data 136 from aiding sources 130 is utilized along with a set of integer candidate arrays 124 from integer estimation logic 116 and differenced carrier phases 120 as inputs into the residual computation logic 310. As mentioned above, the differenced carrier phases 120 may come directly from the GNSS Receiver System 105, or alternately they can be generated from carrier phase measurements from GNSS Receiver System 105 by another on-board system. For example, in one embodiment, Integer Ambiguity Resolution Function 114 (or another function executed by on-board computing device 110) generates the differenced carrier phases 120 after inputting the carrier phase measurements from GNSS Receiver System 105. Using these inputs, residual computation logic 310 computes a set of residuals including: RMS measurement residuals (R1) which comprise the root-mean-square of the measured difference carrier phases 120 minus estimated carrier phases with resolved integers; baseline residuals (R2) which comprise the difference between an estimated baseline length and the survey baseline length 134; attitude residuals (R3) which comprise the difference between estimated Euler angles and the Euler angles as measured by the attitude aiding sensors 132 of aiding sources 130; and a squared norm ratio (R4). Squared norm is the distance of the float values to the integer candidate array. R4 is the ratio of the smallest and the second smallest squared norms in the set of integer candidate arrays.

At the threshold comparison logic 312, a set of the residuals produced by residual computation logic 310 is compared against predetermined thresholds. For example, R1 is compared against an RMS threshold T1, R2 is compared against a baseline threshold T2, R3 is compared against an attitude threshold T3, and R4 is compared against an attitude threshold T4. For example, if the RMS measurement residual is greater than the RMS threshold T1, then the T1 threshold will be considered exceeded. If the baseline residuals (R2) exceeds the baseline threshold T2, then the T2 threshold will be considered exceeded. If the attitude residual (R3) exceeds the baseline threshold T3, then the T3 threshold will be considered exceeded. If the squared norm ratio residual (R4) exceeds the baseline threshold T4, then the T4 threshold will be considered exceeded. As the terms are used herein, having a threshold "satisfied" means that a threshold test is successful, while having a threshold "exceeded" means that the threshold test is failed.

In different implementations utilized for different applications, the priority of the T1, T2, T3, and T4 thresholds may vary. For example, in one embodiment, the T2 threshold has the lowest priority because the baseline size is the variable that is expected to be least trusted. For example, on an aircraft where antenna 103-1 and 103-2 are mounted on opposite wings, some wing flexing may be expected that will cause antenna 103-1 and 103-2 to become closer or farther apart depending on flight conditions or vehicle maneuvering. As such, a substantial deviation between the estimated baseline length calculated by integer ambiguity function 114 and the survey baseline length stored in baseline length data 134 is not an indication that a corresponding integer candidate has converged on an incorrect answer. In the case of low likelihood of faults and high accuracy in attitude data from the aiding sources 130, not exceeding the T3 threshold may have the highest priority. In another embodiment, T4 may be defined to have the lowest priority because the float ambiguities might be very erroneous and therefore the squared norm may vary in how clearly it can indicate the validity of integer candidate arrays. In other embodiments, depending on the vehicle type and its designed mission, the thresholds may be prioritized in another order. That is, just because an integer candidate exceeds T1 in one application to render it an unacceptable solution, some other applications may still be able to accept solution. For example, if the aiding sources 130 are known to comprise relatively inexpensive inertial sensors 132, then the threshold comparison logic may give less priority to satisfying threshold T3. Ultimately, the threshold values are set based on how sensitive an application is to getting to the wrong answer so that both the values and priorities are defined accordingly. It should also be noted that since the different integers candidates are calculated from different integer estimation algorithms, different threshold values for T1, T2, T3 and T4 may be associated with each method. For example, the T4 threshold value may be set differently for the LAMBDA integer estimation algorithm than for another integer estimation algorithm.

Mode update logic 314 operates to define an operating mode of Integer Ambiguity Resolution Function 114, based on which thresholds are satisfied or exceeded. In one embodiment, mode update logic 314 outputs a first mode indication (e.g. Mode M1, or "unresolved") when the Threshold Comparison Logic 312 fails to identify any of the integer candidate arrays as sufficiently acceptable to output as the resolved integers. If no candidate arrays satisfy an acceptable combination of threshold criteria, then the validation logic 117 maintains the Mode M1 "unresolved" state until the Integer Estimation Logic 116 generates the next set of integer candidate arrays 124 at the next epoch. In one embodiment, when Validation Logic 117 has identified one or more acceptable integer candidate arrays from the current set of integer candidate arrays 124, but has not yet decided to resolve, then the validation logic 117 outputs a second mode indication (e.g. Mode M2, or "waiting"). When resolved integers are found, the validation logic 117 outputs a third mode indication (e.g., Mode M3, or "resolved") along with the value of the resolved integers (shown at 126 in FIG. 1). The resolved integers for all baselines 126 are then input into the Attitude and Heading Estimator 118 along with the Differenced Carrier Phases 120 to calculate the attitude and heading of the vehicle (which, once the integer ambiguity is resolved as discussed above, can be calculated by means known in the art). It should also be noted that the operations described herein is carried out on a per baseline basis. That is, resolved integers 126 for the baseline between 103-1, 103-2 are generated as described above and output to Attitude and Heading Estimator 118.

Figure 3A:
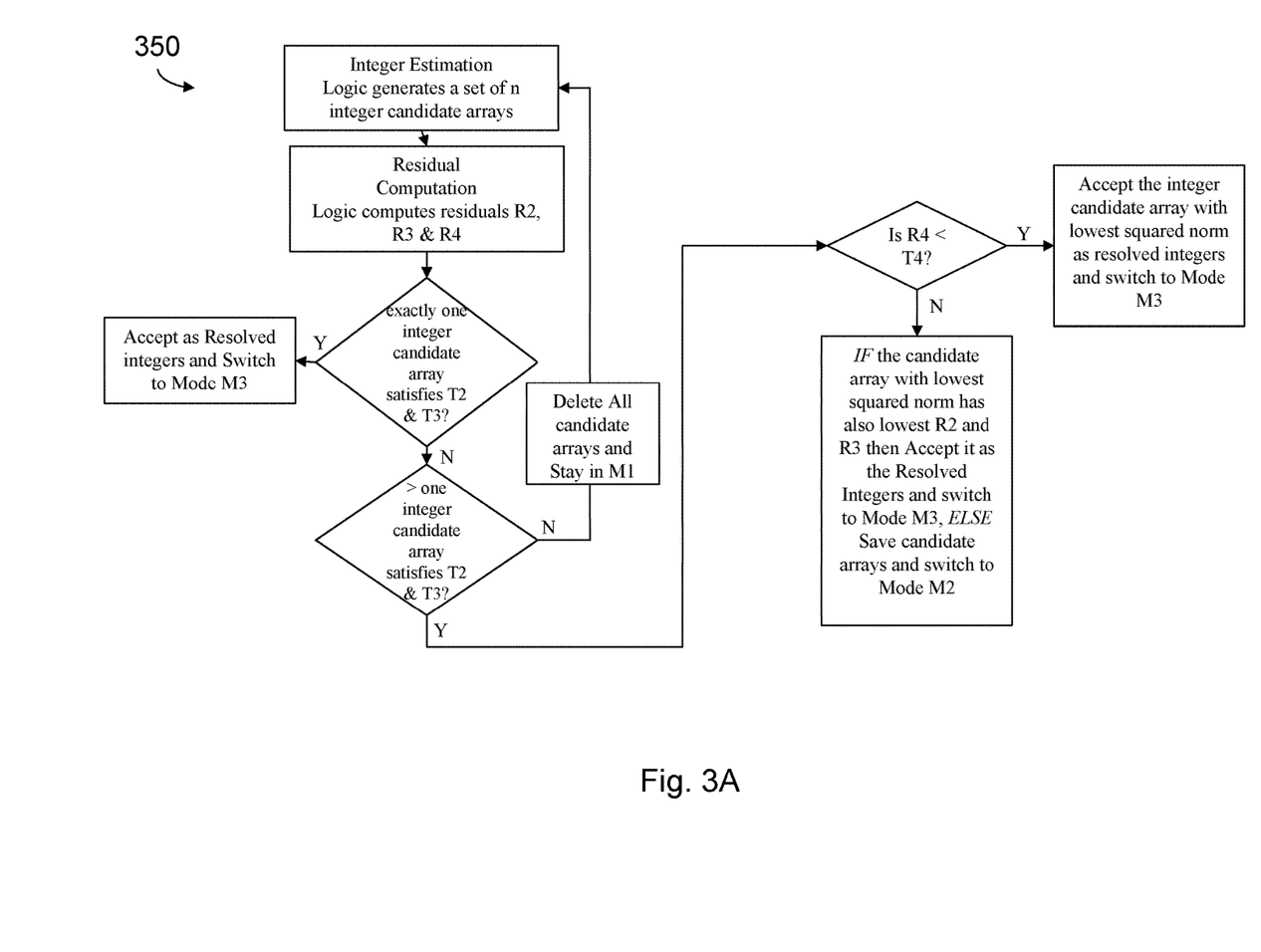
FIGS. 3A-3C are flow charts illustrating example logic flows for validation logic for an Integer Ambiguity Resolution Function of one embodiment of the present disclosure.
Figure 3B:
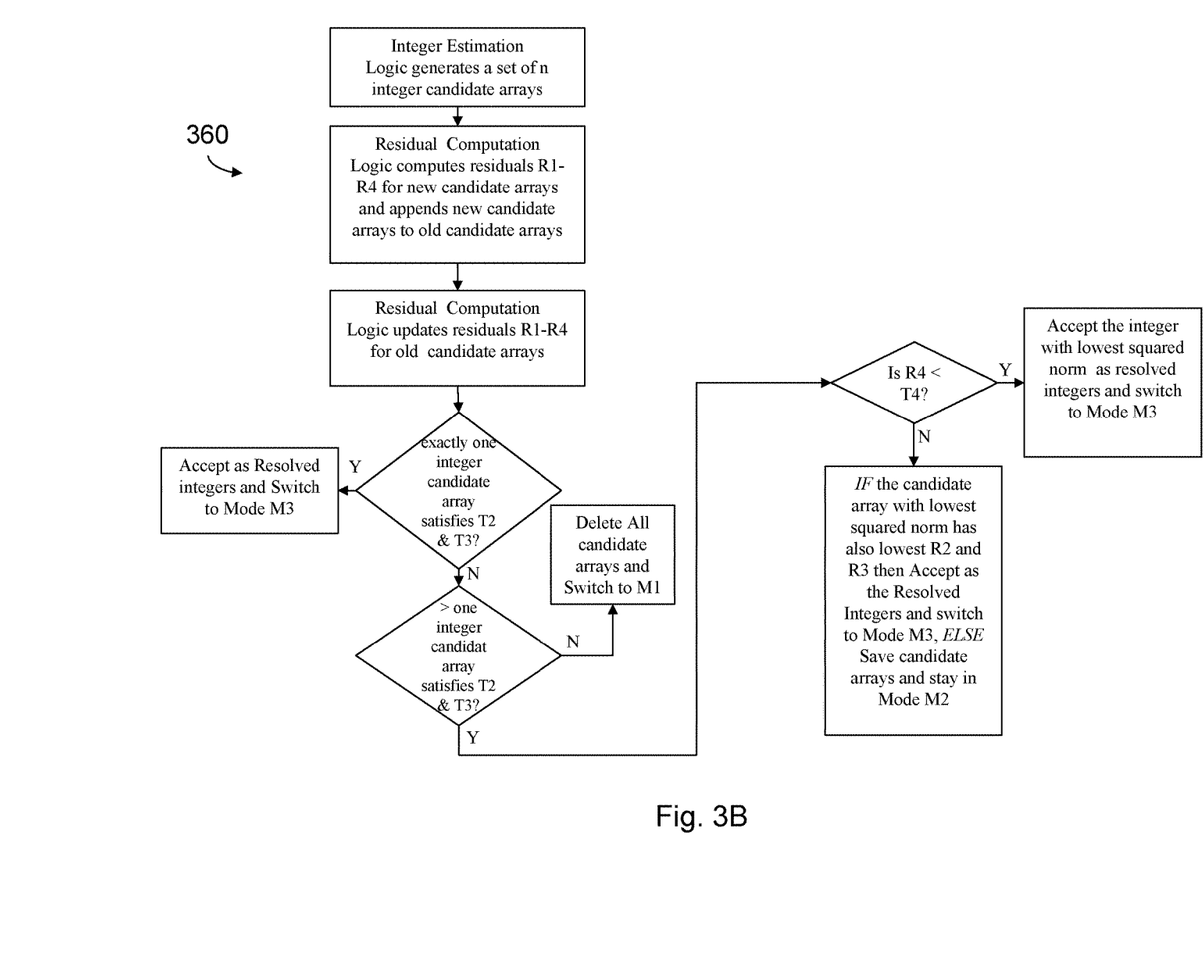
Figure 3C:
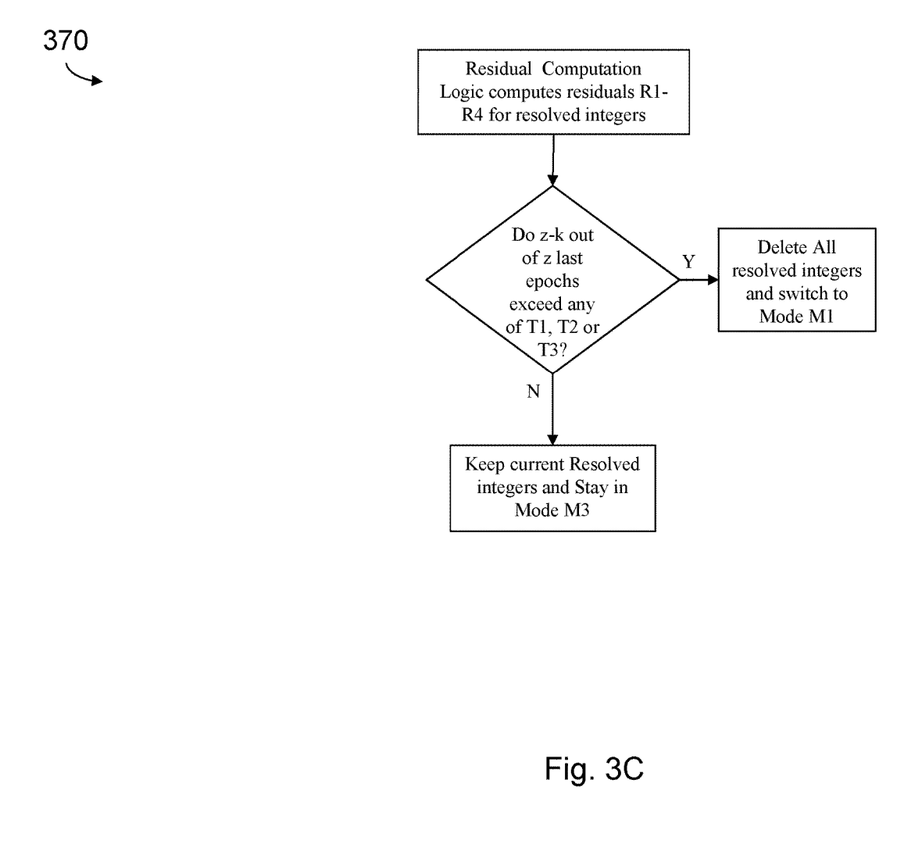

FIG. 3A-C are flow charts illustrating example embodiments of processes that may be implemented by the validation logic 117. As generally shown at 350 in FIG. 3A, an example of operational logic in Mode M1 is illustrated. The Integer Estimation Logic 116 generates a set of integer candidate arrays from which the residual computation logic calculates at least residuals R2 (Baseline), R3 (Attitude) and R4 (squared norm ratio). If exactly one integer candidate array satisfies T2 & T3, then that result is accepted as resolved integers and operation is switched to Mode M3. IF more than one integer candidate array satisfies T2 & T3 and R4 satisfies T4, then the integer candidate array associated with the lowest squared norm is accepted as the resolved integers even if it doesn't have the lowest R2 or R3, and operation is switched to Mode M3. If however R4 exceeds the threshold T4, then if the integer candidate array with lowest squared norm has also lowest R2 and R3, it is accepted as the resolved integer and operation is switched to Mode M3. Otherwise, the candidates satisfying T2 and T3 are saved and operation is switched to mode M2. If none of the integer candidate arrays satisfy thresholds T2 and T3, then all integer candidate arrays are deleted and the operational mode stays in M1 to await the new set of integer candidate arrays calculated from the next epoch.

An example of operational logic in Mode M2 is illustrated at 360 in FIG. 3B. As shown in FIG. 3B, processing of integer candidate arrays is performed in the same manner as in Mode 1, except that previously calculated acceptable integer candidate arrays are stored in memory and are augmented by new integer candidate arrays. That is, the residual computation logic computes residuals for the new candidates freshly provided by the integer estimation logic 116 and re-calculates new residuals for the candidates previously stored. This new combined set of integer candidate arrays is then compared to the thresholds by Threshold Comparison Logic 312 in the same fashion as in FIG. 2A. If a resolved set of integers is identified, then operation is switched to Mode M3. If set of candidates partially satisfy some, but not all desired threshold criteria, they are saved and operation remains in Mode M2. If no candidates meet the minimum requirements, then operation switches to Mode M1.

Finally, an example of operational logic in Mode M3 is illustrated at 370 in FIG. 3C. The residuals for the resolved integers are recalculated at every new epoch with new carrier phase measurements, and residuals are saved in the memory. If a certain number of past residuals (z-k out of z) in the memory no longer satisfy the specified subset of thresholds, then the resolved integers are deleted and operation is switched to Mode M1. If they continue to satisfy the specified subset of thresholds, then the resolved integers are maintained and operation in Mode M3 is maintained.

Figure 4:
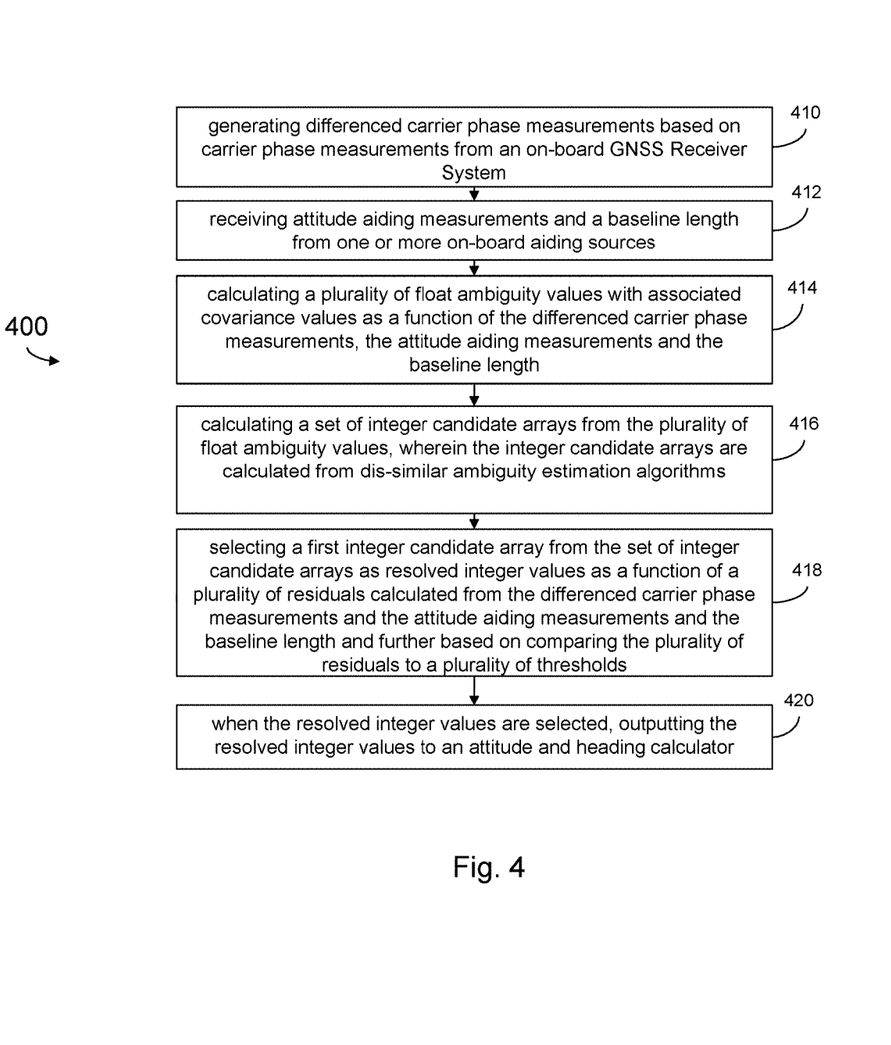
FIG. 4 is a flow chart illustrating a method of one embodiment of the present disclosure.

FIG. 4 is a flow chart illustrating a method of one embodiment of the present disclosure. It should be understood that method 400 may be implemented using any of the embodiments described above with respect to FIGS. 1, 2, 3, and 3A-3C. As such, elements of method 400 may be used in conjunction with, in combination with, or substituted for elements of those embodiments described above. Further, the functions, structures and other description of elements for such embodiments described above may apply to like named elements of method 400 and vice versa.

The method begins at 410 with generating differenced carrier phase measurements based on carrier phase measurements from an on-board GNSS Receiver System. As described above, the carrier phase measurements will come from a GNSS Receiver System having at least a plurality of GNSS receivers with vehicle mounted antennas separated by a surveyed baseline length. The carrier phase measurements may be differenced to produce either single or double differenced carrier phase measurements. In some embodiments, the differenced carrier phase measurements may be produced from the carrier phase measurements by the GNSS Receiver System. In other embodiments, the carrier phase measurements are output to another device, such as on-board computing device 110 for example, that generates the differenced carrier phase measurements from the carrier phase measurements. In one such implementation, the integer ambiguity resolution function itself may generate the differenced carrier phase measurements after receiving the carrier phase measurements from the GNSS receiver system.

The method proceeds to 412 with receiving attitude aiding measurements and a baseline length from one or more on-board aiding sources. The attitude aiding measurements may be generated by onboard inertial measurement sensors such as illustrated at 132 above or other attitude aiding sensors. The baseline length will comprise a measurement of the baseline length distance between the vehicle mounted antennas of block 410. The receiving attitude aiding measurements may, for example, comprise Euler angles from an on-board inertial navigation aiding sensors or from another attitude aiding source.

The method proceeds to 414 with calculating a plurality of float ambiguity values with associated covariance values as a function of the differenced carrier phase measurements, the attitude aiding measurements and the baseline length. As discussed above, standard deviations of code and carrier measurement errors, baseline surveying error, pitch, roll and heading errors may be propagated (for example, by a Kalman filter within the Integer Ambiguity Resolution Function or other statistical prediction and propagation algorithm) according to above computations and any necessary coordinate transformations, in order to obtain the variance-covariance matrix of the float ambiguities.

The method proceeds to 416 with calculating a set of integer candidate arrays from the plurality of float ambiguity values, wherein the integer candidate arrays are calculated from dis-similar ambiguity estimation algorithms. That is, a plurality of different ambiguity estimation algorithms are used to provide integer candidate arrays associated with the difference in number of integer cycles between all tracked satellites and the two GNSS antennas that define the baseline. Thus if, for example, "n" different integer ambiguity estimation algorithms are used by integer estimation logic 116 for the two antenna baseline between antennas 103-1 and 103-2 then the minimum number of integer candidate arrays that would be calculated would be at least one since the different algorithms can produce the same best candidate array. The maximum number of integer candidate arrays that each different integer ambiguity estimation algorithm would generate can be defined by the user. In other embodiments with at least two baselines, the same calculations at block 416 would be performed for each additional baseline.

The method proceeds to 418 with selecting a first integer candidate array from the set of integer candidate arrays as resolved integer values as a function of a plurality of residuals calculated from the differenced carrier phase measurements and the attitude aiding measurements and the baseline length and further based on comparing the plurality of residuals to a plurality of thresholds. In embodiments with more than two antenna, a resolved integer can be similarly calculated for each additional baseline. In some implementations, selecting the resolved integer is performed as described with respect to FIG. 3 by computing residuals associated with each integer candidate array and comparing those residuals to corresponding thresholds. Depending on which thresholds are satisfied, integer candidates may become designates as resolved integers and provided as output. In some embodiments, the method may further comprise outputting a mode indication based on how well the current set of integer candidate arrays satisfy the thresholds. If more than one integer candidate array satisfies one or more thresholds, the resolved integer values may be selected based on the particular combination of thresholds that are satisfied.

For example, in one embodiment, the method outputs a first mode indication (e.g. Mode M1, or "unresolved") when block 418 fails to identify any of the integer candidate arrays as sufficiently acceptable to output as the resolved integer values. If no candidates satisfy an acceptable combination of threshold criteria, then the method maintains the Mode M1 "unresolved" state until the next set of integer candidate arrays are generated at 416 from the next epoch. In one embodiment, when the method at 418 has identified one or more acceptable integer candidate arrays from the current set of integer candidate arrays, but has not yet selected the resolved integer values, then the method at 418 outputs a second mode indication (e.g. Mode M2, or "waiting"). When resolved integer values are identified, the method outputs a third mode indication (e.g., Mode M3, or "resolved") along with the value of the resolved integers. The method accordingly proceeds to 420 where when the resolved integer values are selected, outputting the resolved integer values to an attitude and heading calculator.

EXAMPLE EMBODIMENTS

Example 1 includes a vehicle orientation detection system, the system comprising: a Global Navigation Satellite System (GNSS) receiver system that comprises at least two GNSS receivers; an integer ambiguity resolution function implemented by an on-board computing device, wherein the integer ambiguity resolution function obtains differenced carrier phase measurements generated from carrier phase measurements measured by the GNSS receiver system; a plurality of aiding sources coupled to the integer ambiguity resolution function, wherein the plurality of aiding sources sends to the integer ambiguity resolution function attitude measurements from an attitude aiding sensor and baseline length data associated with a distance between antenna of the at least two GNSS receivers; wherein the integer ambiguity resolution function includes: an initialization logic that calculates float ambiguities and covariances based on the differenced carrier phases, the attitude measurements, and the baseline length data; an integer estimation logic that comprises a plurality of different integer estimation algorithms, wherein the integer estimation logic calculates a set of integer candidate arrays for at least a first baseline between the at least two GNSS receivers from the float ambiguities and covariances using the plurality of different integer estimation algorithms; a validation logic that selects resolved integer values associated with at least the first baseline between the at least two GNSS receivers from the set of integer candidate arrays based at least in part on the attitude measurements and baseline length data from the plurality of aiding sources; and an estimator coupled to the integer ambiguity resolution, wherein the estimator, based on the resolved integer values and measurements from the GNSS receiver system, generates an attitude measurement and a heading measurement.

Example 2 includes the system of claim 1, further comprising: an on on-board computing device comprising a processor and a memory, wherein the on-board computing device implements the integer ambiguity resolution function by executing instruction code stored in the memory.

Example 3 includes the system of claim 2, wherein the on-board computing device implements the estimator by executing instruction code stored in the memory.

Example 4 includes the system of any of claims 1-3, wherein the differenced carrier phases comprise either single differenced carrier phases or double differenced carrier phases.

Example 5 includes the system of any of claims 1-4, wherein at least one of the integer estimation algorithms comprises a Least-squares AMBiguity Decorrelation Adjustment (LAMBDA) algorithm.

Example 6 includes the system of any of claims 1-5, wherein the validation logic comprises: a residual computation logic; a threshold comparison logic; and a mode update logic.

Example 7 includes the system of claim 6, wherein the residual computation logic calculates a plurality of residual values comprising at least: a root-mean-square of the differenced carrier phase measurements minus estimated carrier phases from resolved integers; a baseline residual calculated from a difference between an estimated baseline length and the baseline length data; an attitude residual calculated from a difference between estimated Euler angles and Euler angles as measured by the aiding sources; and a squared norm ratio.

Example 8 includes the system of claim 7, wherein the threshold comparison logic compares each of the plurality of residual values against corresponding threshold values.

Example 9 includes the system of claim 8, wherein the validation logic outputs a first array of resolved integer values based on whether a first set of residual values associated with a candidate integer array satisfies a predetermined combination of one or more of the corresponding threshold values.

Example 10 includes the system of any of claims 8-9, wherein the mode update logic generates an output that indicates whether an operating state of the validation logic is resolved based on an output of the threshold comparison logic, and outputs the resolved integer values when the operating state of the validation logic is determined to be resolved.

Example 12 includes the system of any of claims 1-10, wherein the initialization logic calculates the float ambiguities based on a difference between a) the differenced carrier phases and b) a product of a baseline calculated from the attitude measurements and the baseline length data times a geometry matrix.

Example 12 includes a method for vehicle orientation detection, the method comprising: generating differenced carrier phase measurements based on carrier phase measurements from an on-board GNSS Receiver System; receiving attitude aiding measurements and a baseline length from one or more on-board aiding sources; calculating a plurality of float ambiguity values with associated covariance values as a function of the differenced carrier phase measurements, the attitude aiding measurements and the baseline length; calculating a set of integer candidate arrays from the plurality of float ambiguity values, wherein the integer candidate arrays are calculated from dis-similar ambiguity estimation algorithms; selecting a first integer candidate array from the set of integer candidate arrays as resolved integer values as a function of a plurality of residuals calculated from the differenced carrier phase measurements and the attitude aiding measurements and the baseline length and further based on comparing the plurality of residuals to a plurality of thresholds; and when the resolved integer values are selected, outputting the resolved integer values to an attitude and heading calculator.

Example 13 includes the method of claim 12, wherein the differenced carrier phases comprise either single differenced carrier phases or double differenced carrier phases.

Example 14 includes the method of any of claims 12-13, wherein at least one of the integer estimation algorithm comprises a Least-squares AMBiguity Decorrelation Adjustment (LAMBDA) algorithm.

Example 15 includes the method of any of claims 12-14, wherein calculating the plurality of float ambiguity values comprises calculating the plurality of float ambiguity values from a difference between a) the differenced carrier phases and b) a product of a baseline calculated from the attitude aiding measurements and the baseline length times a geometry matrix.

Example 16 includes the method of any of claims 12-15, wherein selecting the first integer candidate array from the set of integer candidate arrays comprises: computing a plurality of residual values with a residual computation logic; and applying the set of integer candidate arrays to a threshold comparison logic.

Example 17 includes the method of claim 16, wherein the residual computation logic calculates the plurality of residual values comprising at least: a root-mean-square of the differenced carrier phase measurements minus estimated carrier phases estimated from resolved integers; a baseline residual calculated from a difference between an estimated baseline length and the baseline length data; an attitude residual calculated from a difference between an estimated attitude angle and Euler angles as measured by the aiding sources; and a squared norm ratio.

Example 18 includes the method of claim 17, wherein the threshold comparison logic compares each of the plurality of residual values against corresponding threshold values.

Example 19 includes the method of claim 18, electing the first integer candidate array of the plurality of integer candidate arrays is based on whether a first set of residuals values associated with the first integer candidate array satisfies a pre-determined combination of one or more of the corresponding threshold values.

Example 20 includes the method of any of claims 16-19, further comprising determining an operating state using a mode update logic, wherein the mode update logic generates an output that indicates whether an operating state of the validation logic is resolved based on an output of the threshold comparison logic, and outputs the resolved integer values when the operating state of the validation logic is determined to be resolved.

Figure 2:
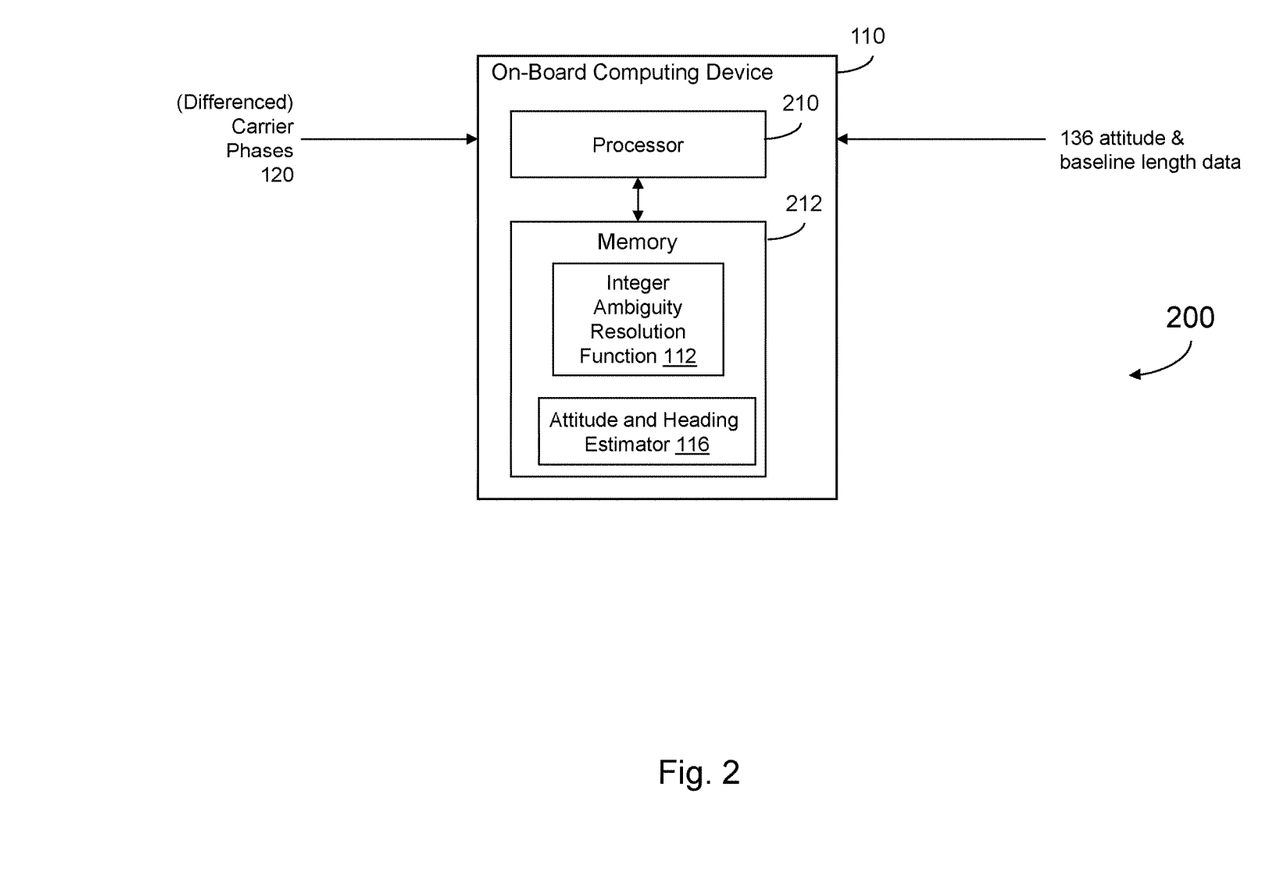
FIG. 2 is a block diagram illustrating one implementation of an Integer Ambiguity Resolution Function and Attitude and Heading Estimator of one embodiment of the present disclosure.

In various alternative embodiments, system elements, method steps, or examples described throughout this disclosure (such as the Integer Ambiguity Resolution Function, Attitude and Heading Estimator, the Initialization Logic, the Integer Estimation Logic, and/or the Validation Logic, and/or or sub-parts thereof, for example) may be implemented using one or more computer systems, field programmable gate arrays (FPGAs), or similar devices comprising a processor coupled to a memory (such as shown in FIG. 2, for example) and executing code to realize those elements, processes, or examples, said code stored on a non-transient data storage device. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A vehicle orientation detection system, the system comprising:
   a Global Navigation Satellite System (GNSS) receiver system that comprises at least two GNSS receivers;
   an integer ambiguity resolution function implemented by an on-board computing device, wherein the integer ambiguity resolution function obtains differenced carrier phase measurements generated from carrier phase measurements measured by the GNSS receiver system;
   a plurality of aiding sources coupled to the integer ambiguity resolution function, wherein the plurality of aiding sources sends to the integer ambiguity resolution function attitude measurements from an attitude aiding sensor and baseline length data associated with a distance between antenna of the at least two GNSS receivers;

wherein the integer ambiguity resolution function includes:
  an initialization logic that calculates float ambiguities and covariances based on the differenced carrier phases, the attitude measurements, and the baseline length data;
  an integer estimation logic that comprises a plurality of different integer estimation algorithms, wherein the integer estimation logic calculates a set of integer candidate arrays for at least a first baseline between the at least two GNSS receivers from the float ambiguities and covariances using the plurality of different integer estimation algorithms;
  a validation logic that selects resolved integer values associated with at least the first baseline between the at least two GNSS receivers from the set of integer candidate arrays based at least in part on the attitude measurements and baseline length data from the plurality of aiding sources; and
  an estimator coupled to the integer ambiguity resolution, wherein the estimator, based on the resolved integer values and measurements from the GNSS receiver system, generates an attitude measurement and a heading measurement.

2. The system of claim 1, further comprising:
an on on-board computing device comprising a processor and a memory, wherein the on-board computing device implements the integer ambiguity resolution function by executing instruction code stored in the memory.

3. The system of claim 2, wherein the on-board computing device implements the estimator by executing instruction code stored in the memory.

4. The system of claim 1, wherein the differenced carrier phases comprise either single differenced carrier phases or double differenced carrier phases.

5. The system of claim 1, wherein at least one of the integer estimation algorithms comprises a Least-squares AMBiguity Decorrelation Adjustment (LAMBDA) algorithm.

6. The system of claim 1, wherein the validation logic comprises:
  a residual computation logic;
  a threshold comparison logic; and
  a mode update logic.

7. The system of claim 6, wherein the residual computation logic calculates a plurality of residual values comprising at least:
  a root-mean-square of the differenced carrier phase measurements minus estimated carrier phases from resolved integers;
  a baseline residual calculated from a difference between an estimated baseline length and the baseline length data;
  an attitude residual calculated from a difference between estimated Euler angles and Euler angles as measured by the aiding sources; and
  a squared norm ratio.

8. The system of claim 7, wherein the threshold comparison logic compares each of the plurality of residual values against corresponding threshold values.

9. The system of claim 8, wherein the validation logic outputs a first array of resolved integer values based on whether a first set of residual values associated with a candidate integer array satisfies a pre-determined combination of one or more of the corresponding threshold values.

10. The system of claim 8, wherein the mode update logic generates an output that indicates whether an operating state of the validation logic is resolved based on an output of the threshold comparison logic, and outputs the resolved integer values when the operating state of the validation logic is determined to be resolved.

11. The system of claim 1, wherein the initialization logic calculates the float ambiguities based on a difference between a) the differenced carrier phases and b) a product of a baseline calculated from the attitude measurements and the baseline length data times a geometry matrix.

12. A method for vehicle orientation detection, the method comprising:
  generating differenced carrier phase measurements based on carrier phase measurements from an on-board Global Navigation Satellite System (GNSS) Receiver System;
  receiving attitude aiding measurements and a baseline length from one or more on-board aiding sources;
  calculating a plurality of float ambiguity values with associated covariance values as a function of the differenced carrier phase measurements, the attitude aiding measurements and the baseline length;
  calculating a set of integer candidate arrays from the plurality of float ambiguity values, wherein the integer candidate arrays are calculated from dis-similar ambiguity estimation algorithms;
  selecting a first integer candidate array from the set of integer candidate arrays as resolved integer values as a function of a plurality of residuals calculated from the differenced carrier phase measurements and the attitude aiding measurements and the baseline length and further based on comparing the plurality of residuals to a plurality of thresholds; and
  when the resolved integer values are selected, outputting the resolved integer values to an attitude and heading calculator.

13. The method of claim 12, wherein the differenced carrier phases comprise either single differenced carrier phases or double differenced carrier phases.

14. The method of claim 12, wherein at least one of the integer estimation algorithm comprises a Least-squares AMBiguity Decorrelation Adjustment (LAMBDA) algorithm.

15. The method of claim 12, wherein calculating the plurality of float ambiguity values comprises calculating the plurality of float ambiguity values from a difference between a) the differenced carrier phases and b) a product of a baseline calculated from the attitude aiding measurements and the baseline length times a geometry matrix.

16. The method of claim 12, wherein selecting the first integer candidate array from the set of integer candidate arrays comprises:
  computing a plurality of residual values with a residual computation logic; and
  applying the set of integer candidate arrays to a threshold comparison logic.

17. The method of claim 16, wherein the residual computation logic calculates the plurality of residual values comprising at least:
  a root-mean-square of the differenced carrier phase measurements minus estimated carrier phases estimated from resolved integers;
  a baseline residual calculated from a difference between an estimated baseline length and the baseline length data;
  an attitude residual calculated from a difference between an estimated attitude angle and Euler angles as measured by the aiding sources; and
  a squared norm ratio.

18. The method of claim 17, wherein the threshold comparison logic compares each of the plurality of residual values against corresponding threshold values.

19. The method of claim 18, electing the first integer candidate array of the plurality of integer candidate arrays is based on whether a first set of residuals values associated with the first integer candidate array satisfies a pre-determined combination of one or more of the corresponding threshold values.

20. The method of claim 16, further comprising determining an operating state using a mode update logic, wherein the mode update logic generates an output that indicates whether an operating state of the validation logic is resolved based on an output of the threshold comparison logic, and outputs the resolved integer values when the operating state of the validation logic is determined to be resolved.

* * * * *